(12) United States Patent
Xu et al.

(10) Patent No.: US 10,977,513 B2
(45) Date of Patent: Apr. 13, 2021

(54) METHOD, SYSTEM AND COMPUTER READABLE STORAGE MEDIUM FOR IDENTIFYING INFORMATION CARRIED ON SHEET

(71) Applicant: Hangzhou Glority Software Limited, Zhejiang (CN)

(72) Inventors: Qingsong Xu, Zhejiang (CN); Mingquan Chen, Zhejiang (CN); Huan Luo, Zhejiang (CN)

(73) Assignee: Hangzhou Glorify Software Limited, Zhejiang (CN)

( * ) Notice: Subject to any disclaimer, the term of this patent is extended or adjusted under 35 U.S.C. 154(b) by 123 days.

(21) Appl. No.: 16/100,940

(22) Filed: Aug. 10, 2018

(65) Prior Publication Data

US 2019/0318189 A1 Oct. 17, 2019

(30) Foreign Application Priority Data

Apr. 13, 2018 (CN) .......................... 201810331391.3

(51) Int. Cl.
*G06K 9/62* (2006.01)
*G06K 9/34* (2006.01)
(Continued)

(52) U.S. Cl.
CPC .......... *G06K 9/344* (2013.01); *G06K 9/00442* (2013.01); *G06K 9/00469* (2013.01);
(Continued)

(58) Field of Classification Search
CPC .... G06K 7/1404; G06K 7/1408; G06K 7/143; G06K 7/1443; G06K 7/1447;
(Continued)

(56) References Cited

U.S. PATENT DOCUMENTS 9,141,607 B1 * 9/2015 Lee ...................... G06K 9/6821
10,262,235 B1 * 4/2019 Chen ................... G06K 9/00422
(Continued)

FOREIGN PATENT DOCUMENTS

CN 105426856 A 3/2016
CN 105956626 A 9/2016
(Continued)

OTHER PUBLICATIONS

S. Basavaraj Patil and N. V. Subbareddy, "Neural network based system for script identification in Indian documents", Springer, Sadhana, vol. 27, Part 1, Feb. 2002, pp. 83-97 (Year: 2002).*
(Continued)

*Primary Examiner* — Eric Rush
(74) *Attorney, Agent, or Firm* — JCIP Global Inc.

(57) ABSTRACT

A method for identifying information carried on a sheet is disclosed. The method comprises: identifying, using one or more computing devices, each of one or more areas on the sheet based on an image of the sheet and a pre-trained first model, wherein each of the one or more areas is associated with all or part of the information carried on the sheet, and the first model is a neural network based model; and identifying, using one or more computing devices, characters in each of the one or more areas based on the image of the sheet, each of the one or more areas and a pre-trained second model so as to determine the information carried on the sheet, wherein the second model is a neural network based model.

17 Claims, 7 Drawing Sheets

(51) Int. Cl.
*G06K 9/32* (2006.01)
*G06K 9/66* (2006.01)
*G06K 9/00* (2006.01)
*G06K 9/72* (2006.01)
*G06K 9/20* (2006.01)

(52) U.S. Cl.
CPC ......... *G06K 9/2054* (2013.01); *G06K 9/3283* (2013.01); *G06K 9/66* (2013.01); *G06K 9/72* (2013.01); *G06K 2209/01* (2013.01); *G06T 2207/30176* (2013.01)

(58) Field of Classification Search
CPC ............ G06K 7/1456; G06K 9/00442; G06K 9/00449; G06K 9/00456; G06K 9/00463; G06K 9/00469; G06K 9/00852; G06K 9/18; G06K 9/186; G06K 9/2054; G06K 9/2063; G06K 9/2072; G06K 9/3283; G06K 9/34; G06K 9/344; G06K 9/36; G06K 9/62; G06K 9/6267; G06K 9/6271; G06K 9/66; G06K 9/72; G06K 2009/363; G06K 2209/01; G06K 2209/011; G06K 2209/013; G06K 9/03; G06K 9/033; G06K 9/6253; G06K 9/6254; G06K 9/6262; G06K 9/6263; G06K 9/6264; G06K 9/6265; G06K 9/6277; G06T 3/0006; G06T 3/0056; G06T 3/60; G06T 3/602; G06T 3/608; G06T 7/10; G06T 7/11; G06T 2207/20081; G06T 2207/20084; G06T 2207/30176; G06N 3/02; G06N 3/04; G06N 3/0445; G06N 3/0454; G06N 3/08; G06N 3/088; H04N 1/00681; H04N 1/00684; H04N 1/00718; H04N 1/00721; H04N 1/00724; H04N 1/00726; G06F 3/005; G06F 3/018; G06F 3/06; G06F 16/20; G06F 16/35; G06F 16/353; G06F 17/40; G06F 40/279; G07B 2017/00725
USPC ................. 382/100–102, 112–114, 135–140, 382/155–161, 173, 175–177, 180–182, 382/185–187, 200, 224, 229, 254, 276, 382/282, 289–293, 296, 321, 309–311; 705/1.1, 24, 29–31, 33–35, 39, 40, 42, 705/45; 358/1.18, 452, 453, 462; 706/12, 14–16, 20, 25–27, 30, 45–48; 235/2, 3, 375, 383–386
See application file for complete search history.

(56) References Cited

U.S. PATENT DOCUMENTS

| | | | | |
|---|---|---|---|---|
| 10,417,350 | B1* | 9/2019 | Mohamed | G06F 40/58 |
| 2004/0117192 | A1* | 6/2004 | Miletzki | G06K 9/72 704/277 |
| 2006/0018544 | A1* | 1/2006 | Ohguro | G06K 9/3208 382/181 |
| 2009/0016611 | A1* | 1/2009 | Campbell | G06K 9/3208 382/199 |
| 2013/0322757 | A1* | 12/2013 | Pan | G06K 9/18 382/182 |
| 2014/0064618 | A1* | 3/2014 | Janssen, Jr. | G06K 9/00469 382/182 |
| 2014/0161365 | A1* | 6/2014 | Acharya | G06K 9/00469 382/229 |
| 2015/0117748 | A1 | 4/2015 | Smith et al. | |
| 2017/0004374 | A1* | 1/2017 | Osindero | G06K 9/00476 |
| 2017/0371958 | A1* | 12/2017 | Ganjam | G06N 7/005 |
| 2018/0032842 | A1* | 2/2018 | Yellapragada | G06K 9/00442 |
| 2018/0033147 | A1* | 2/2018 | Becker | G06K 9/72 |
| 2019/0156486 | A1* | 5/2019 | Wang | G06T 7/11 |
| 2019/0251369 | A1* | 8/2019 | Popov | G06K 9/00791 |
| 2019/0286691 | A1* | 9/2019 | Sodhani | G06N 3/08 |
| 2019/0362193 | A1* | 11/2019 | Dai | G06K 9/00228 |

FOREIGN PATENT DOCUMENTS

| | | |
|---|---|---|
| CN | 106469304 A | 3/2017 |
| CN | 106557747 A | 4/2017 |
| CN | 107220648 A | 9/2017 |
| CN | 107341523 A | 11/2017 |
| CN | 107545262 A | 1/2018 |
| CN | 107688808 A | 2/2018 |
| CN | 107766809 A | 3/2018 |
| CN | 107798299 A | 3/2018 |
| CN | 107808157 A | 3/2018 |
| CN | 107862303 A | 3/2018 |
| CN | 107977665 A | 5/2018 |
| JP | 2005-284503 A | 10/2005 |

OTHER PUBLICATIONS

Xiangyu Zhu, Yingying Jiang, Shuli Yang, Xiaobing Wang, Wei Li, Pei Fu, Hua Wang and Zhenbo Luo, "Deep Residual Text Detection Network for Scene Text" IEEE, 14th IAPR International Conference on Document Analysis and Recognition (ICDAR), 2017, pp. 807-812 (Year: 2017).*

Baoguang Shi, Xiang Bai and Cong Yao, "Script Identification in the Wild via Discriminative Convolutional Neural Network" Elsevier, Pattern Recognition, vol. 52, Apr. 2016, pp. 448-458 (Year: 2016).*

Chinese Office Action with English language translation for Chinese Patent Application No. 201810331391.3, dated Jan. 22, 2020 16 pgs.

* cited by examiner

METHOD, SYSTEM AND COMPUTER READABLE STORAGE MEDIUM FOR IDENTIFYING INFORMATION CARRIED ON SHEET

CROSS-REFERENCE TO RELATED APPLICATIONS

This application claims priority to Chinese Patent Application No. 201810331391.3, filed on Apr. 13, 2018, which is hereby incorporated by reference in its entirety.

TECHNICAL FIELD

The present disclosure relates to a method, a system and a computer readable storage medium for identifying information carried on a sheet.

BACKGROUND

It is not easy to accurately identify information carried on various sheets. Therefore, there is a need for new technology.

SUMMARY

One of aims of the present disclosure is to provide a method, a system and a computer readable storage medium for identifying information carried on a sheet.

One aspect of this disclosure is to provide a method for identifying information carried on a sheet. The method may comprise: identifying, using one or more computing devices, each of one or more areas on the sheet based on an image of the sheet and a pre-trained first model, wherein each of the one or more areas is associated with all or part of the information carried on the sheet, and the first model is a neural network based model; and identifying, using one or more computing devices, characters in each of the one or more areas based on the image of the sheet, each of the one or more areas and a pre-trained second model so as to determine the information carried on the sheet, wherein the second model is a neural network based model.

Another aspect of this disclosure is to provide a system for identifying information carried on a sheet. The system may comprise: a first model that is a neural network based model; a second model that is a neural network based model; and one or more first devices configured to: identify each of one or more areas on the sheet based on an image of the sheet and the first model, wherein each of the one or more areas is associated with all or part of the information carried on the sheet; and identify characters in each of the one or more areas based on the image of the sheet, each of the one or more areas and the second model so as to determine the information carried on the sheet.

Another aspect of this disclosure is to provide a computer readable storage medium for identifying information carried on a sheet. 20. The computer readable storage medium having computer executable instructions stored thereon that, when executed by one or more processors, cause the one or more processors to: identify each of one or more areas on the sheet based on an image of the sheet and a pre-trained first model, wherein each of the one or more areas is associated with all or part of the information carried on the sheet, and the first model is a neural network based model; and identify characters in each of the one or more areas based on the image of the sheet, each of the one or more areas and a pre-trained second model so as to determine the information carried on the sheet, wherein the second model is a neural network based model.

Further features of the present disclosure and advantages thereof will become apparent from the following detailed description of exemplary embodiments with reference to the attached drawings.

BRIEF DESCRIPTION OF THE DRAWINGS

The accompanying drawings, which constitute a part of the specification, illustrate embodiments of the present disclosure and, together with the description, serve to explain the principles of the present disclosure.

The present disclosure will be better understood according the following detailed description with reference of the accompanying drawings.

Figure 1:
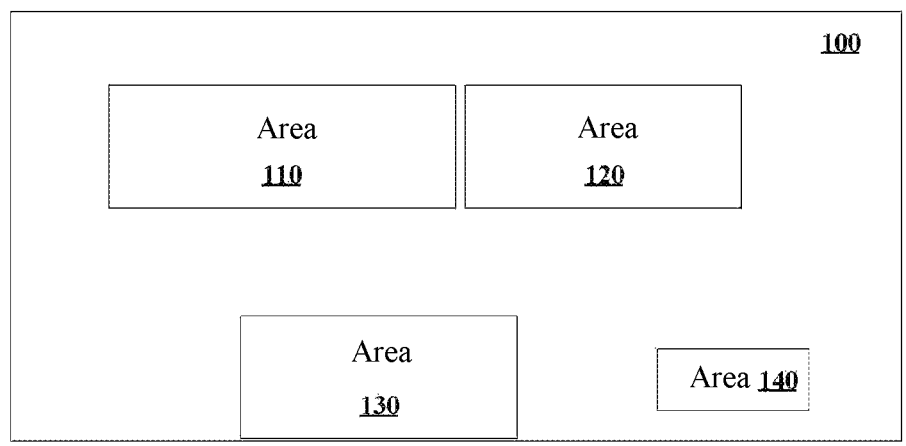
FIG. 1 is a diagram schematically showing at least a part of an example of a sheet applicable to some embodiments of the present disclosure.

Note that, in the embodiments described below, in some cases the same portions or portions having similar functions are denoted by the same reference numerals in different drawings, and description of such portions is not repeated. In some cases, similar reference numerals and letters are used to refer to similar items, and thus once an item is defined in one figure, it need not be further discussed for following figures.

DETAILED DESCRIPTION

Various exemplary embodiments of the present disclosure will be described in details with reference to the accompanying drawings in the following. It should be noted that the relative arrangement of the components and steps, the numerical expressions, and numerical values set forth in these embodiments do not limit the scope of the present invention unless it is specifically stated otherwise.

The following description of at least one exemplary embodiment is merely illustrative in nature and is in no way intended to limit this disclosure, its application, or uses. It should be understood by those skilled in the art that, these examples, while indicating the implementations of the present disclosure, are given by way of illustration only, but not in an exhaustive way.

Techniques, methods and apparatus as known by one of ordinary skill in the relevant art may not be discussed in detail, but are intended to be regarded as a part of the specification where appropriate.

A method for identifying information carried on a sheet is provided. The method according to some embodiments of the present disclosure includes: identifying each of one or more areas on the sheet based on an image of the sheet and a pre-trained first model, wherein each of the one or more areas is associated with all or part of the information carried on the sheet, and the first model is a neural network based model; and identifying characters in each of the one or more areas based on the image of the sheet, each of the one or more areas and a pre-trained second model so as to determine the information carried on the sheet, wherein the second model is a neural network based model. Each of these operations above in the method may be performed by one or more computing devices. For example, identifying each of one or more areas on the sheet may be performed by one or more computing devices, and identifying characters in each of the one or more areas may also be performed by one or more computing devices. The one or more computing devices performing identifying each of one or more areas and the one or more computing devices performing identifying characters may be the same or completely/partially different.

In some embodiments, identifying the characters in each of the one or more areas comprising: identifying the characters in each of the one or more areas based on an image of each of the one or more areas and the second model. In some embodiments, identifying the characters in each of the one or more areas comprising: identifying the characters in each of the one or more areas based on the image of the sheet, a position of each of the one or more areas and the second model.

It should be appreciated that the term "sheet" used in the present disclosure refers to an entity on which information is carried, and the information is arranged on the sheet in one or more patterns and is expressed by one or more types of Chinese characters, foreign language characters, numbers, symbols, graphics and the like. Some specific examples of the "sheet" used in the present disclosure may be an invoice, a bill, a tax bill, a receipt, a shopping list, a catering ticket, a policy of insurance, an expense account, a deposit transaction list, a credit card statement of account, an express order, a travel itinerary, a ticket, a boarding check, an information page of a patent publication, a ballot paper, a questionnaire, an evaluation form, a check-in form, an application form, and other various sheets filled in manually and/or by machines. Those skilled in the art can appreciate that the "sheet" used in the present disclosure is not limited to these specific examples listed herein, and is not limited to financial or business sheets, nor limited to sheets with official seals thereon, may be a sheet with a print font or a handwriting font, may be a sheet with or without a prescribed and/or general format.

By identifying the characters in each of the one or more areas on the sheet, the information carried on the sheet may be determined based on the information expressed by these characters. For example, for the sheet 100 as shown in FIG. 1, the areas 110, 120, 130, 140 on the sheet 100 are identified based on the pre-trained first model, wherein each area is associated with a type of information carried on the sheet 100; then the characters in the areas 110, 120, 130, 140 are identified based on a pre-trained second model respectively, so that the content of the information for each area on the sheet 100 can be determined. For example, each area includes at least an area surrounded by a minimum bounding box of the characters contained in the area. In some embodiments, the image of the sheet and the position of each of the one or more areas are input into the pre-trained second model, so that the characters in each of the one or more areas are identified through the second model. In some embodiments, the image of each of the one or more areas is input into the pre-trained second model so that the characters in each of the one or more areas are identified through the second model.

Those skilled in the art can appreciate that the sheet 100 shown in FIG. 1 is merely illustrative and is not used to limit the present disclosure. Although four areas 110, 120, 130, 140 are shown in FIG. 1, it is apparent that the areas on the sheet of the present disclosure may be fewer or more. Although each of the areas 110, 120, 130, 140 shown in FIG. 1 is outlined by a rectangle parallel to a horizontal line, an area may also be outlined by a rectangle that tilts relative to a horizontal line, a parallelogram, an arbitrary quadrilateral or the like, or be outlined by a circle, an ellipse, a polygon (such as a triangle, a trapezoid, and an arbitrary polygon), an irregular shape or the like. Any area on the sheet of the present disclosure may be arranged at any position on the sheet. For example, in FIG. 1, the area 110 and the area 120 may be closer or even adjacent, the area 130 may be located at an edge of the sheet 100, and the area 140 may be smaller than any other areas. Of course, those skilled in the art can also appreciate that the arranging pattern, the position relationship, the sizes and the like of these areas on the sheet of the present disclosure are not limited to FIG. 1, which is depended on a specific sheet.

The image of the sheet refers to a visually presented sheet, such as a picture, a video or the like of the sheet. Identifying each of the one or more areas on the sheet includes identifying the boundary of the area. For example, in the case that the boundary of the area is outlined by a rectangle parallel to a horizontal line, the area may be determined by determining at least two apexes of the rectangle. When the boundary of the area is outlined by a rectangle that tilts relative to a horizontal line, the area may be determined by determining at least three apexes of the rectangle. An R-CNN based object detection, a YOLO based object detection, text detection based on primitive detection targets (e.g., character-based, word-based, text-line-based or the like), text detection based on the shape of target bounding boxes (horizontal or nearly horizontal text detection, multi-oriented text detection or the like) may be applied.

In some embodiments, the position of each area needs to be input into the second model to identify the characters in the area. The position of the area may be in any form capable of indicating the position of the area on the sheet. For example, the position of the area may be coordinates (absolute coordinates or relative coordinates) of one or more apexes of the area on the image of the sheet, may also be a coordinate (absolute or relative) of at least an apex and at least a side length on the image of the sheet, and may also be a coordinate (absolute or relative) of the center of the area and a radius on the image of the sheet. The characters in each area may be one or more types of Chinese characters, foreign language characters, numbers, symbols, graphics, and the like.

In some embodiments, the image of each of the one or more areas is input into the second model to identify the characters in the area. In some cases, for example, in the case that the boundary of the area is outlined by a rectangle that tilts relative to a horizontal line, a tilt correction may be performed on the image of the area, so that the image of the area input into the second model is an image subjected to the a tilt correction. For example, a tilt correction may be performed by: determining a tilt angle of the rectangle for defining the boundary of the area that tilts relative to the horizontal line, and then rotating the image of the area by the tilt angle determined, so that the rectangle for defining the boundary of the area is parallel to a horizontal line. The tilt angle may be calculated according to the coordinates of the apexes of the rectangle for defining the boundary of the area.

Figure 6:
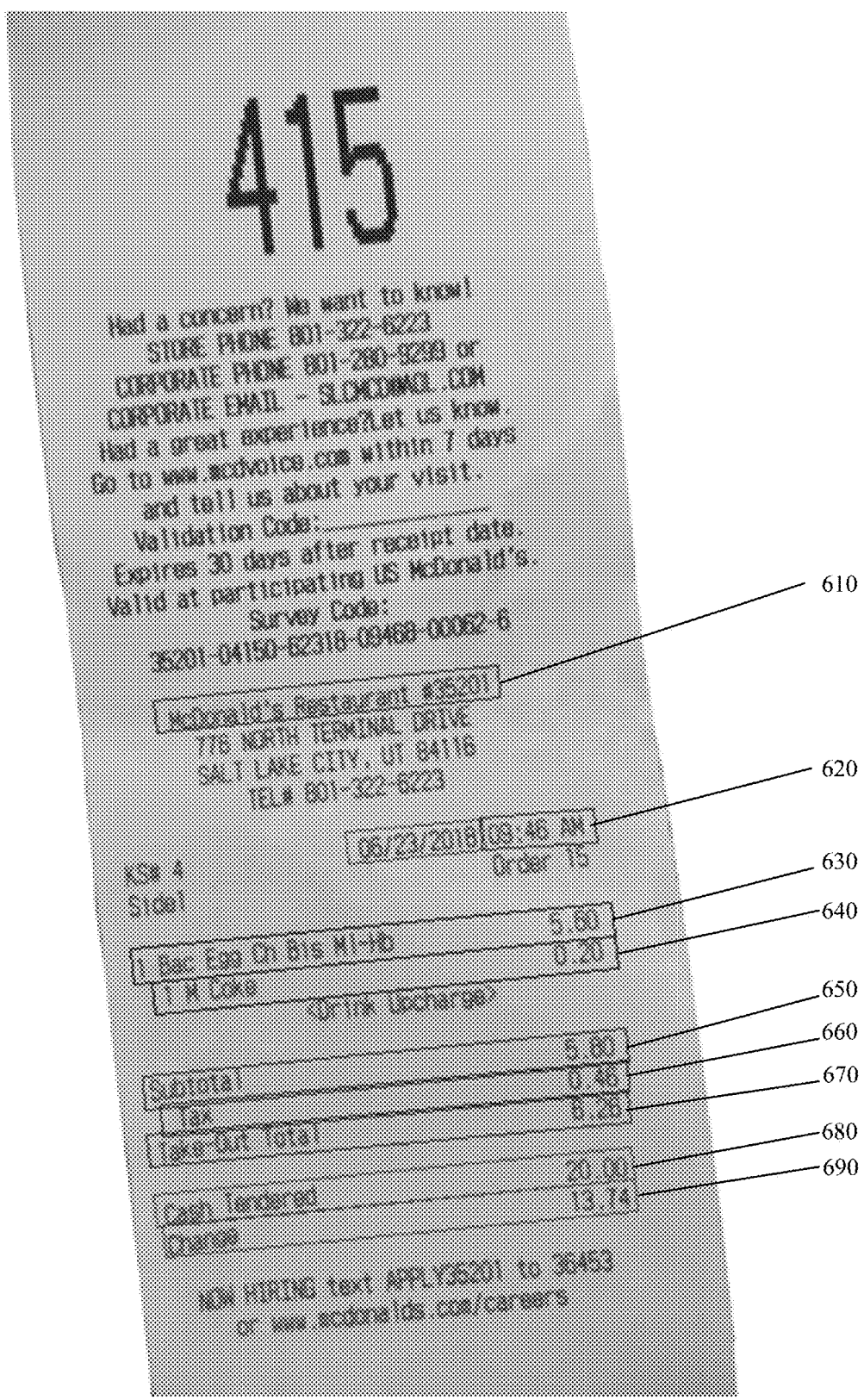
FIG. 6 is a diagram schematically showing at least a part of an example of an image of a sheet applicable to some embodiments of the present disclosure.

FIG. 6 schematically shows an example of an image of a sheet applicable to the present disclosure. According to the contents described above, the image of the sheet is input into a first model, and the first model identifies one or more areas 610 to 690. Each identified area is outlined by a frame indicated by the reference signs 610 to 690. Those skilled in the art can appreciate that the first model may also identify more or less areas than those areas shown in the drawings.

The first model may further identify the type of the information associated with each area while identifying each of one or more areas. For example, the information associated with the area 610 is a name and a code of a business, the information associated with the area 620 is time of generating the sheet, the information associated with the areas 630, 640 is details and amounts of payment, the information associated with the area 650 is a subtotal of amounts of payment, the information associated with the area 660 is a tax, the information associated with the area 670 is a total of amounts of payment, and the information associated with the area 680 is a collected amount, and the information associated with the area 690 is a change amount.

Figure 7A:
FIG. 7A is a diagram of an identified area in the sheet as shown in FIG. 6.
Figure 7B:
FIG. 7B is a diagram of the area as shown in FIG. 7A subjected to a tilt correction.
Figure 7C:
FIG. 7C is a diagram of an identified area in the sheet as shown in FIG. 6.
Figure 7D:
FIG. 7D is a diagram of the area as shown in FIG. 7C subjected to a tilt correction.

The image of each area of the areas 610 to 690 may then be respectively input into a second model to identify the characters in each area. For example, the image of the area 610 as shown in FIG. 7A or the image of the area 650 as shown in FIG. 7C may be input into the second model to identify the characters in the areas. In addition, since the frames defining the areas 610 to 690 tilt relative to a horizontal line, in some embodiments, the images of the respective areas may be input into the second model after a tilt correction. For example, for the image of the area 610 as shown in FIG. 7A or the image of the area 650 as shown in FIG. 7C, acquiring coordinates of at least two apexes of the rectangle tilt relative to a horizontal line for defining the boundary of the area, calculating the tilt angle of the rectangle relative to the horizontal line, and rotating the image of the area by the tilt angle so that the rectangle for defining the boundary of the area is parallel to a horizontal line may be performed for the tilt correction. Thereafter, the image of the area 610 subjected to the tilt correction as shown in FIG. 7B or the image of the area 650 subjected to the tilt correction as shown in FIG. 7D may be input into the second model to identify the characters in the area.

Thereafter, the information carried on the sheet can be determined based on the identified characters in the areas and the type of the information associated with the areas. In the embodiment, the information carried on the sheet, including literal content of the name and numerical content of the code of the business in the area 610, numerical content of the time of generating the sheet in the area 620, literal content of the details of payment and numerical content of the amounts of payment in the areas 630 and 640, numerical content of the subtotal of the amounts of payment in the area 650, numerical content of the tax in the area 660, numerical content of the total of the amounts of payment in the area 670, numerical content of the collected amount in the area 680 and the numerical content of the change amount in the area 690 is finally determined. The above-mentioned identified information may be directly displayed on the corresponding areas on the image of the sheet, and/or may be output for display in the form of a table, segmented text or the like.

In the present disclosure, using models based on neural networks, one or more areas in the image of the sheet to be identified are firstly identified and then the characters in each area are identified so as to identify the information carried on the sheet. Thus, the information carried on various sheets can be identified efficiently and accurately. For example, an image of a sheet in low resolution, skewed, illegible, stained, pleated, or filled in (manually and/or by machine) a non-standard form can be identified using the method of the present disclosure and the system described below.

The first model may be obtained through following processes: labeling each sheet image sample in a first set of sheet image samples to label each of one or more areas in each sheet image sample, wherein each of one or more areas is associated with all or part of information carried on a sheet image sample; and training a first neural network based on the first set of sheet image samples labeled to obtain the first model. For example, an example of an image of a sheet labeled may be shown in FIG. 6. The types of information associated with the areas 610 to 690 may also be labeled while the areas 610 to 690 are labeled. In some embodiments, the first neural network is established based on a deep residual network (Resnet).

Training the first neural network may further include: testing the output accuracy of the trained first neural network based on a fourth set of sheet image samples; increasing the number of the sheet image samples in the first set of sheet image samples if the output accuracy is less than a predetermined first threshold, wherein each sheet image sample in the increased sheet image samples is labeled; and re-training the first neural network using the first set of sheet image samples with the number of the sheet image samples being increased. Then, the output accuracy of the re-trained first neural network is tested based on the fourth set of sheet image samples, until the output accuracy of the first neural network meets a requirement, i.e., not less than the pre-determined first threshold. In this way, the first neural network with the output accuracy meeting the requirement can be used as the pre-trained first model in the above description.

The second model may be obtained through following processes: labeling each sheet image sample in a second set of sheet image samples to label characters in each of one or more areas in each sheet image sample, wherein each of one or more areas is associated with all or part of information carried on a sheet image sample; and training a second neural network based on the second set of sheet image samples labeled to obtain the second model. In some embodiments, the second neural network may be trained based on the image of the sheet in the second set of sheet image samples and the position of each of the one or more areas on the sheet to obtain the second model. In some embodiments, the second neural network may be trained based on the image of each of the one or more areas on the sheet in the second set of sheet image samples to obtain the second model. In some cases of these embodiments, for example, in the case that the boundary of the area is outlined by a rectangle tilts relative to a horizontal line, the image of the area input into the second neural network is an image subjected to a tilt correction. For example, the tilt angle of the rectangle for defining the boundary of the area that tilts relative to the horizontal line may be determined, and then the image of the area may be rotated by the tilt angle determined, so that the rectangle for defining the boundary of the area is parallel to a horizontal line so as to perform the tilt correction. The tilt angle may be calculated according to the coordinates of the apexes of the rectangle for defining the boundary of the area. In some embodiments, the second neural network is established based on a recurrent neural network (RNN).

Training the second neural network may further include: testing the output accuracy of the trained second neural network based on a fifth set of sheet image samples; increasing the number of the sheet image samples in the second set of sheet image samples if the output accuracy is less than a pre-determined second threshold, wherein each sheet image sample in the increased sheet image samples is labeled; and re-training the second neural network using the second set of sheet image samples with the number of the sheet image samples being increased. Then, the output accuracy of the re-trained second neural network is tested based on the fifth set of sheet image samples, until the output accuracy of the second neural network meets a requirement, i.e., not less than the pre-determined second threshold. In this way, the second neural network with the output accuracy meeting the requirement can be used as the pre-trained second model in the above description.

Those skilled in the art can appreciate that the first set of sheet image samples for training the first neural network and the second set of sheet image samples for training the second neural network may be the same set or different sets. That is, the first set of sheet image samples and the second set of sheet image samples may include identical sheet image samples, or may include completely different or partially different sheet image samples. The fourth set of sheet image samples for testing the first neural network and the fifth set of sheet image samples for testing the second neural network may be the same set or different sets. That is, the fourth set of sheet image samples and the fifth set of sheet image samples may include identical sheet image samples, or may include completely different or partially different sheet image samples. The pre-determined first threshold for judging whether the output accuracy of the first neural network meets a requirement in a test and the pre-determined second threshold for judging whether the output accuracy of the second neural network meets a requirement in a test may be the same value or different values. The numbers of the sheet image samples in the first and second set of sheet image samples, and the numbers of the sheet image samples in the fourth and fifth set of sheet image samples, may be selected as needed. The image of the sheet subjected to an identification may be added to any of the above sets of sheet image samples as a sheet image sample, so that the number of the sheet image samples used for training and/or testing may be continuously increased, and the accuracy of the trained model may be accordingly improved.

Figure 2A:
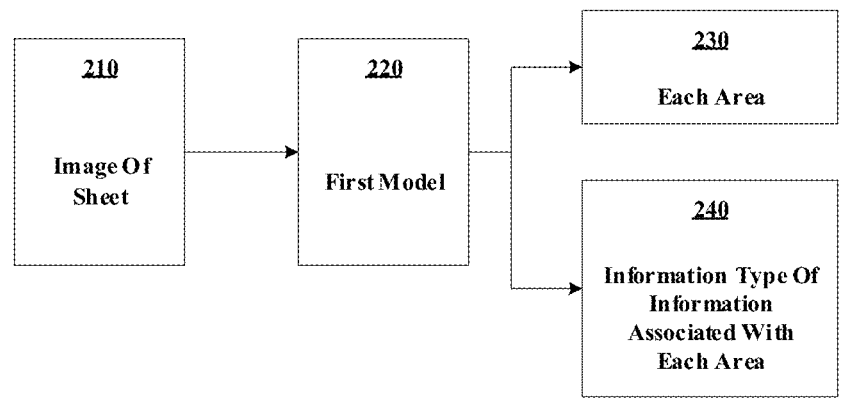
FIGS. 2A and 2B are block diagrams respectively schematically showing at least a part of a method for identifying information carried on a sheet according to some embodiments of the present disclosure.
Figure 2B:
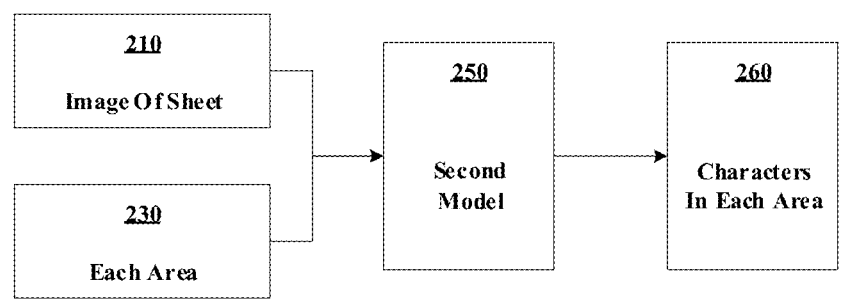

FIGS. 2A and 2B are block diagrams schematically showing at least part of a method for identifying information carried on a sheet according to some embodiments of the present disclosure. Each area 230 in the one or more areas on the sheet is identified based on the image 210 of the sheet to be identified and the pre-trained first model 220; and the characters 260 in each of the one or more areas on the sheet are identified based on the image 210 of the sheet to be identified, each area 230 of the one or more areas and the pre-trained second model 250. In some embodiments, based on the image 210 of the sheet and the first model 220, an information type 240 of information associated with each of the one or more areas is further identified; and the information carried on the sheet is determined based on the identified information type 240 of information associated with each area and the identified characters 260 in each of the one or more areas. In some embodiments, the characters 260 in each of the one or more areas on the sheet are identified based on the image of each area 230 of the one or more areas on the sheet. In some embodiments, the characters 260 in each of the one or more areas on the sheet are identified based on the image of the whole sheet and the position of each area 230 of the one or more areas on the image of the sheet.

The information type of the information associated with an area may be one or more types. For example, when the sheet is a certain application form, in a case, the information type of the information associated with an area on the sheet may be an applicant name, and the information type of the information associated with another area on the sheet may be an identity card (ID card) number; in another case, the information type of the information associated with an area on the sheet may be the applicant name and the ID card number. For example, when the sheet is a certain invoice, in a case, the information type of the information associated with an area on the sheet may be an invoice code, and the information type of the information associated with another area on the sheet may be a pre-tax amount; and in another case, the information type of the information associated with an area on the sheet may be the invoice code and the pre-tax amount. The information types of the information associated with different areas of the one or more areas may be the same or different. For example, when the sheet is a shopping list, in a case, the information type of the information associated with the plurality of different areas may all be shopping products.

Figure 3:
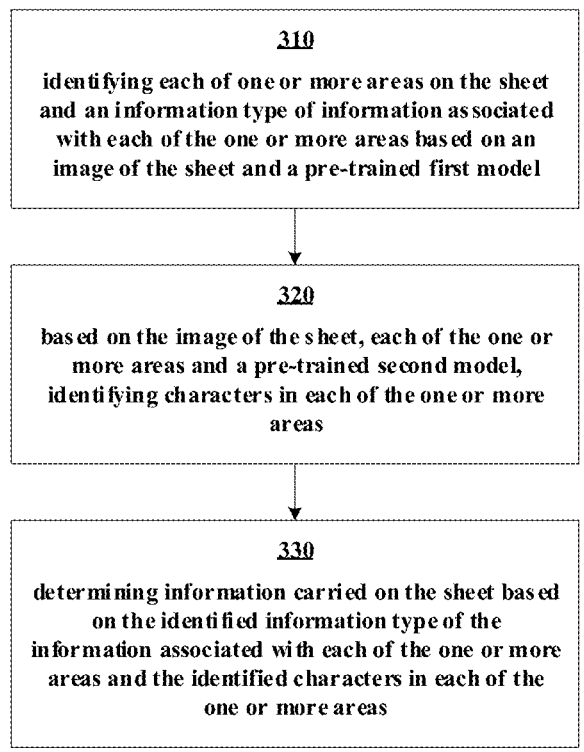
FIG. 3 is a flowchart schematically showing at least a part of a method for identifying information carried on a sheet according to some embodiments of the present disclosure.

FIG. 3 is a flowchart schematically showing at least a part of a method for identifying information carried on a sheet according to some embodiments of the present disclosure. The method according to some embodiments of the present disclosure includes: identifying each of one or more areas on the sheet and an information type of information associated with each of the one or more areas based on an image of the sheet and a pre-trained first model (310); based on the image of the sheet, each of the one or more areas and a pre-trained second model, identifying characters in each of the one or more areas (320); and determining information carried on the sheet based on the identified information type of the information associated with each of the one or more areas and the identified characters in each of the one or more areas (330).

In these embodiments, the first model may be obtained by: labeling, for each sheet image sample in a first set of sheet image samples, each of one or more areas in each sheet image sample, wherein each of the one or more areas is associated with all or part of information carried on the sheet image sample; and training a first neural network based on the labeled first set of sheet image samples to obtain the first model. The output accuracy of the trained first neural network may also be tested based on a fourth set of sheet image samples, and if the output accuracy does not meet a requirement, for example less than a pre-determined first threshold, the number of the sheet image samples in the fourth set of sheet image samples is increased, and the first neural network is re-trained until the output accuracy of the first neural network meets the requirement. In this way, the first neural network with the output accuracy meeting the requirement can be used as the pre-trained first model in the above description.

In some embodiments, before each of the one or more areas on the sheet is identified, the method of the present disclosure further includes: identifying a category of the sheet based on the image of the sheet and a pre-trained third model, wherein the third model is a neural network based model; and selecting first model and/or the second model to be used based on the identified category. In some embodiments, the category of the sheet includes at least a language of the sheet. For example, the language of the sheet may be one or more of: Chinese, English, Japanese and other languages, Morse code, graphic character, ASCII code and other languages presented in an encoded form. Then, the first model and/or the second model to be used is selected based on the identified language. For example, different first models and/or second models may be pre-trained for different languages, which is conducive to improve the accuracy of the model.

The third model may be obtained by: labeling, for each sheet image sample in a third set of sheet image samples, a category of each sheet image sample; and training, a third neural network based on the labeled third set of sheet image samples to obtain the third model. In some embodiments, the third neural network is established based on a deep convolutional neural network (CNN). The training for the third model may further include: testing the output accuracy of the trained third neural network based on a sixth set of sheet image samples; increasing the number of the sheet image samples in the sixth set of sheet image samples if the output accuracy is less than a pre-determined third threshold, wherein each sheet image sample in the increased sheet image samples is labeled; and re-training the third neural network based on the sixth set of sheet image samples after the number of the sheet image samples is increased. Then, the output accuracy of the re-trained third neural network is tested based on the sixth set of sheet image samples, until the output accuracy of the third neural network is not less than the pre-determined third threshold. In this way, the third neural network with the output accuracy meeting the requirement can be used as the pre-trained third model in the above description.

Those skilled in the art can appreciate that the third set of sheet image samples and the first and second set of sheet image samples may be the same set or different sets. The sixth set of sheet image samples and the fourth and fifth set of sheet image samples may be the same set or different sets. The third threshold and the first and second thresholds may be the same value or different values. The number of the sheet image samples in the third set of sheet image samples and the sixth set of sheet image samples may be selected as needed. An image of an identified sheet may be added as a sheet image sample to any of the sets of sheet image samples for training and/or testing, so that the number of the sheet image samples in any of the sets of sheet image samples for training and/or testing may be always increased, and the accuracy of the trained model may be always improved.

Figure 4:
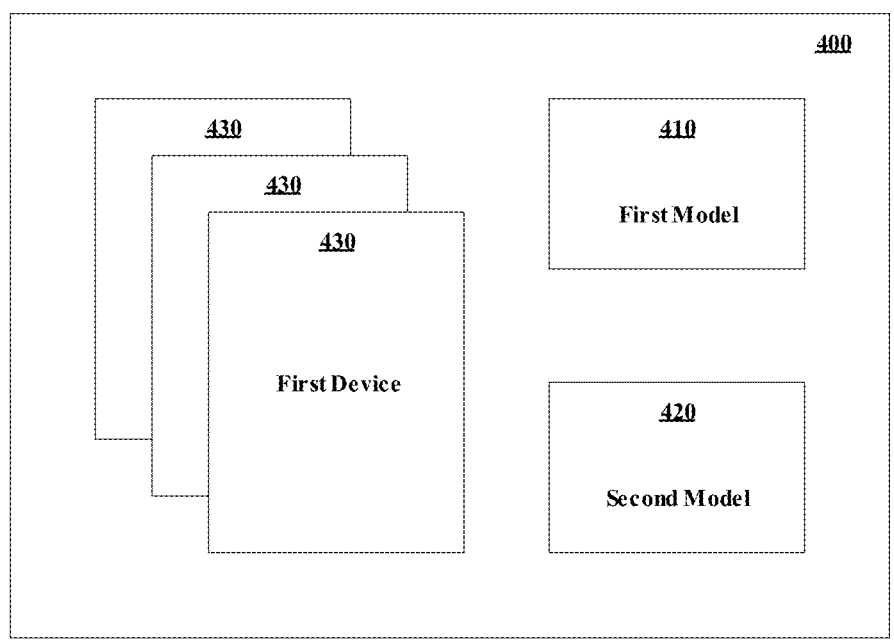
FIG. 4 is a diagram schematically showing at least a part of a system for identifying information carried on a sheet according to some embodiments of the present disclosure.

FIG. 4 is a structural diagram schematically showing at least a part of a system 400 for identifying information carried on a sheet according to some embodiments of the present disclosure. Those skilled in the art can appreciate that the system 400 is only an example and should not be considered as a limitation on the scope of the present disclosure or the features described herein. In the example, the system 400 may include a first model 410, a second model 420, and one or more first devices 430. The first model 410 is a neural network based model and the second model 420 is a neural network based model. The one or more first devices 430 may be configured to: identify each of one or more areas on the sheet based on an image of the sheet and the first model 410, wherein each of the one or more areas is associated with all or part of the information carried on the sheet; and identify characters in each of one or more areas based on the image of the sheet, each of the one or more areas and the second model 420 so as to determine the information carried on the sheet. In some embodiments, identifying the characters in each of the one or more areas comprising: identifying the characters in each of the one or more areas based on an image of each of the one or more areas and the second model 420. In some embodiments, identifying the characters in each of the one or more areas comprising: identifying the characters in each of the one or more areas based on the image of the sheet, a position of each of the one or more areas and the second model 420.

The image of each of the one or more areas is outlined by a rectangle parallel to a horizontal line or a rectangle that tilts relative to a horizontal line, and the one or more first devices 430 may be further configured to: perform a tilt correction for the image of the at least one of the one or more areas before identifying the characters in the case that an image of at least one of the one or more areas is outlined by a rectangle that tilts relative to a horizontal line, wherein identifying the characters in each of the one or more areas comprising: identifying characters in the at least one of the one or more areas based on the image of the at least one of the one or more areas after the tilt correction and the second model 420.

It can be seen from the above description that the one or more first devices 430 may be further configured to: identifying an information type of information associated with each of the one or more areas based on the image of the sheet and the first model; and determining the information carried on the sheet based on the identified information type of the information associated with each of the one or more areas and the identified characters in each of the one or more areas. The system 400 for identifying the information carried on the sheet of the present disclosure may further include a neural network based third model (not shown). The one or more first devices 430 may be further configured to: before identifying each of the one or more areas on the sheet, identifying a category of the sheet based on the image of the sheet and the third model; and selecting the first model and/or the second model to be used based on the identified category.

Those skilled in the art can appreciate that the various operations described above with respect to the one or more first devices 430 may be performed in one first device 430, or in a plurality of first devices 430. Each of the one or more first devices 430 may be a computing device, a storage device, or a device having both computing and storage functions.

Although the first model 410, the second model 420 and the one or more first devices 430 in the system 400 shown in FIG. 4 are respectively represented by separate blocks, the first model 410 and the second model 420 may be stored in the one or more first devices 430. For example, the first model 410 and the second model 420 are both stored in the same first device 430, or the first model 410 and the second model 420 are stored in different first devices 430 respectively, or a part of any one of the first model 410 and the second model 420 is stored in the first device 430, and other parts are stored in other first devices 430; or of course, the first model 410 and the second model 420 may also be stored in other devices instead of one or more first devices 430.

The identified information carried on the sheet may be used for a downstream operation. The downstream operation may be performed by one or more second devices (see 520 in FIG. 5). The one or more second devices may be configured to: transmit the image of the sheet to the one or more first devices 430; and acquire digitized identified information carried on sheet from the one or more first devices 430. The digitized information acquired by the one or more second devices may be used to the downstream operation. For example, for an attendance sheet, the one or more second devices may use the identified information to calculate the attendance rate and the like; and for a shopping receipt, the one or more second devices may use the identified information to obtain a consumption record.

Those skilled in the art can appreciate that the one or more second devices for transmitting the image of the sheet to the one or more first devices 430 and the one or more second devices for acquiring the digitized information from the one or more first devices 430 may be the same or different.

Figure 5:
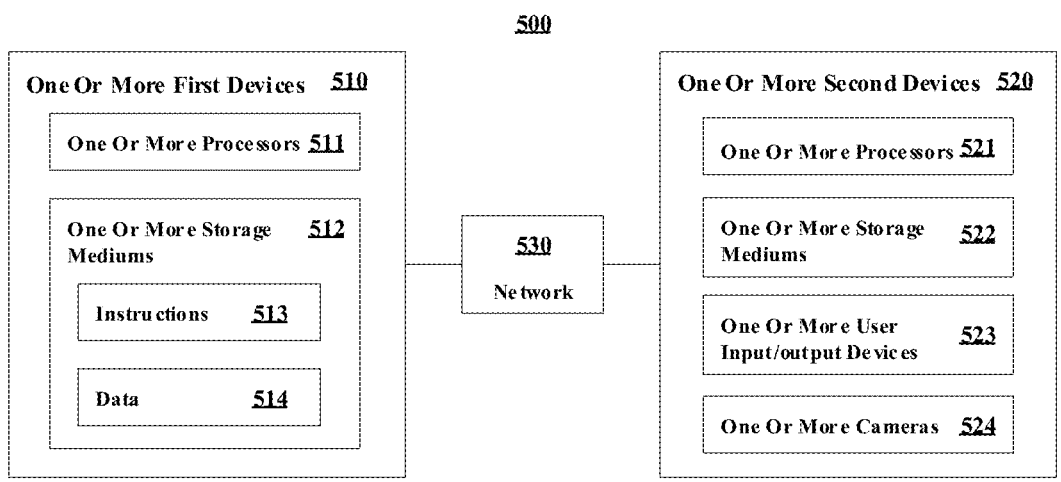
FIG. 5 is a diagram schematically showing at least a part of a system for identifying information carried on a sheet according to some embodiments of the present disclosure.

FIG. 5 is a structural diagram schematically showing at least a part of a system 500 for identifying information carried on a sheet according to some embodiments of the present disclosure. The system 500 includes one or more first devices 510 and one or more second devices 520, wherein the one or more first devices 510 are coupled to the one or more second devices 520 via a network 530; each of the one or more first devices 510 may also be connected with others of the one or more first devices 510 via the network 530, or one element of each first device 510 may also be connected with other one or more elements via the network 530; and each of the one or more second devices 520 may also be connected with others of the one or more second devices 520 via the network 530, or one element of each second device 520 may also be connected with other one or more elements via the network 530.

Each of the one or more first devices 510 may be a computing device, a storage device, or a device having both computing and storage functions. Each of the one or more first devices 510 may include one or more processors 511, one or more storage mediums 512, and other components typically found in devices such as computers. Each of the one or more storage mediums 512 of the one or more first devices 510 may store contents accessible by the one or more processors 511, including instructions 513 executable by the one or more processors 511, and data 514 that can be retrieved, manipulated or stored by the one or more processors 511.

The instructions 513 may be any set of instructions to be executed directly, such as machine code, or indirectly, such as scripts, by the one or more processors 511. In that regard, the terms "instructions", "application", "steps" and "programs" may be used interchangeably herein. The instructions 513 may be stored in object code format for direct processing by the one or more processors 511, or in any other computing device language including scripts or collections of independent source code modules that are interpreted on demand or compiled in advance. The instructions 513 may include instructions that cause one or more computing devices such as the first device 510 to behave as the first, second and/or the third neural networks. Functions, methods and routines of the instructions 513 are explained in more detail above.

The one or more storage mediums 512 may be any transitory or non-transitory computer readable storage medium capable of storing contents accessible by the one or more processors 511, such as a hard drive, a memory card, an ROM, an RAM, a DVD, a CD, a USB memory, a write-enabled memory, a read-only memory or the like. The one or more memories 512 may include a distributed storage system where the instructions 513 and/or the data 514 are stored on a plurality of different storage devices which may be physically located at the same or different geographic locations. The one or more storage mediums 512 may be coupled to the one or more first devices 510 via the network 530 shown in FIG. 5, and/or can be directly connected to or incorporated into any of the one or more first devices 510.

The one or more processors 511 may retrieve, store or modify the data 514 in accordance with the instructions 513. The data 514 stored in the one or more storage mediums 512 may include an image of a sheet to be identified, various sets of sheet image samples, parameters for the first, second and/or the third neural networks, and the like. Other data not associated with the image of the sheet or the neural network may also be stored in the one or more storage mediums 512. For example, although the subject matter described herein is not limited by any particular data structure, the data 514 may also be stored in computer registers (not shown) as a table or XML document having many different fields and records stored in a relationship database. The data 514 may also be formatted in any computing device-readable format such as, but not limited to, binary values, ASCII or Unicode. In addition, the data 514 may include any information sufficient to identify relevant information, such as a serial number, descriptive text, a dedicated code, a pointer, references to data stored in other memories such as at other network locations, or information used by a function for computing related data.

The one or more processors 511 may be any conventional processors, such as a commercially available central processing unit CPU, graphic processing unit GPU, and the like. Alternatively, the one or more processors 511 may also be dedicated components, such as an application specific integrated circuit ("ASIC") or other hardware based processor. Although not necessary, the one or more first devices 510 may include specialized hardware components to perform specific computing processes, such as image processing for the image of the sheet and the like, faster or more efficiently.

Although the one or more first devices 510, the one or more processors 511, the one or more storage mediums 512 and other components are schematically illustrated within the same block in FIG. 5, the first devices, the processors, the computers, the computing devices or the storage mediums may actually include multiple processors, computers, computing devices, or storage mediums that may exist in the same physical housing or in different physical housings. For example, one of the one or more storage mediums 512 may be a hard drive or other storage mediums located in one or more housings different from the housing of each of the one or more first devices 510. Thus, references to processors, computers, computing devices, or memories will be understood as including references to a set of processors, computers, computing devices, or memories that may be operated in parallel or not. For example, the one or more first devices 510 may include server computing devices that are operated as a load balanced server cluster. Additionally, although some functions described above are indicated to occur on a single computing device having a single processor, various aspects of the subject matter described herein can be implemented by a plurality of first devices 510, for example, communicating information over network 530.

Each of the one or more first devices 510 may be located at different nodes of the network 530 and capable of directly and/or indirectly communicating with other nodes of network 530. Although only the first device 510 and the second device 520 are depicted in FIG. 5, those skilled in the art can appreciated that the system 500 may also include other computing devices, and each different computing device is located at a different node of the network 530. The network 530 and the components in the system described herein (e.g., the first and second devices, the first, second, and third models and the like) can be interconnected using various protocols and systems, such that the network 530 can be a part of the Internet, the World Wide Web, a specific intranet, a wide area network or a local area network. The network 530 can utilize standard communication protocols such as Ethernet, WiFi and HTTP, proprietary protocols for one or more companies, and various combinations of the foregoing protocols. Although certain advantages are obtained when the information is transmitted or received as described above, the subject described herein is not limited to any particular information transmission mode.

Each of the one or more second devices 520 may be similar to each of the one or more first devices 510, for example, having one or more processors 521, one or more storage mediums 522, as well as instructions and data as described above. Each of the one or more second devices 520 may be a personal computing device intended for use by a user and have all of the components normally used in connection with a personal computing device such as a central processing unit CPU, memory (e.g., RAM and an internal hard drive) for storing data and instructions, and one or more user input/output devices 523 such as a display (e.g., a monitor having a screen, a touch-screen, a projector, a television, or other device that is operable to display information), a mouse, a keyboard, a touch screen, a microphone, a speaker, and/or a network interface device. The one or more second devices 520 may also include one or more cameras 524 for capturing still images or recording video streams, and all of the components used for connecting these elements to one another.

Although the one or more second devices 520 may each include a full-sized personal computing device, they may optionally include a mobile computing device capable of wirelessly exchanging data with a server over a network such as the Internet. For example, the one or more second devices 520 may be mobile phones, or devices such as PDAs with wireless support, tablet PCs, or netbooks capable of obtaining information over the Internet. In another example, the one or more second devices 520 may be wearable computing systems.

The term "A or B" used through the specification refers to "A and B" and "A or B" rather than meaning that A and B are exclusive, unless otherwise specified.

In the present disclosure, a reference to "one embodiment", "an embodiment" or "some embodiments" means that features, structures, or characteristics described in connection with the embodiment(s) are included in at least one embodiment, at least some embodiments of the present disclosure. Thus, the phrases "in an embodiment" and "in some embodiments" in the present disclosure do not mean the same embodiment(s). Furthermore, the features, structures, or characteristics may be combined in any suitable combination and/or sub-combination in one or more embodiments.

The term "exemplary", as used herein, means "serving as an example, instance, or illustration", rather than as a "model" that would be exactly duplicated. Any implementation described herein as exemplary is not necessarily to be construed as preferred or advantageous over other implementations. Furthermore, there is no intention to be bound by any expressed or implied theory presented in the preceding technical field, background, summary or detailed description.

The term "substantially", as used herein, is intended to encompass any slight variations due to design or manufacturing imperfections, device or component tolerances, environmental effects and/or other factors. The term "substantially" also allows for variation from a perfect or ideal case due to parasitic effects, noise, and other practical considerations that may be present in an actual implementation.

In addition, the foregoing description may refer to elements or nodes or features being "connected" or "coupled" together. As used herein, unless expressly stated otherwise, "connected" means that one element/node/feature is electrically, mechanically, logically or otherwise directly joined to (or directly communicates with) another element/node/feature. Likewise, unless expressly stated otherwise, "coupled" means that one element/node/feature may be mechanically, electrically, logically or otherwise joined to another element/node/feature in either a direct or indirect manner to permit interaction even though the two features may not be directly connected. That is, "coupled" is intended to encompass both direct and indirect joining of elements or other features, including connection with one or more intervening elements.

In addition, certain terminology, such as the terms "first", "second" and the like, may also be used in the following description for the purpose of reference only, and thus are not intended to be limiting. For example, the terms "first", "second" and other such numerical terms referring to structures or elements do not imply a sequence or order unless clearly indicated by the context.

Further, it should be noted that, the terms "comprise", "include", "have" and any other variants, as used herein, specify the presence of stated features, integers, steps, operations, elements, and/or components, but do not preclude the presence or addition of one or more other features, integers, steps, operations, elements, components, and/or groups thereof.

In the present disclosure, the terms "component" and "system" are intended to refer to a computer-related entity, or a hardware, a combination of a hardware and a software, a software, or an executing software. For example, a component may be, but not limited to, a process running on a processor, an object, an executing state, an executable thread, and/or a program, etc. By way of example, either an application running on one server or the server may be a component. One or more components may reside within an executing process and/or thread, and a component may be located on a single computer and/or distributed between two or more computers.

Furthermore, those skilled in the art will recognize that boundaries between the above described operations are merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments. However, other modifications, variations and alternatives are also possible. The description and drawings are, accordingly, to be regarded in an illustrative rather than in a restrictive sense.

Although some specific embodiments of the present disclosure have been described in detail with examples, it should be understood by a person skilled in the art that the above examples are only intended to be illustrative but not to limit the scope of the present disclosure. The embodiments disclosed herein can be combined arbitrarily with each other, without departing from the scope and spirit of the present disclosure. It should be understood by a person skilled in the art that the above embodiments can be modified without departing from the scope and spirit of the present disclosure. The scope of the present disclosure is defined by the attached claims.

What is claimed is:

1. A method for identifying information carried on a sheet, comprising:
    identifying, using one or more computing devices, a language of the sheet based on an image of the sheet and a pre-trained third model, wherein the pre-trained third model is a neural network based model;
    selecting, using the one or more computing devices, a pre-trained first model that is for the language to implement identifying, using the one or more computing devices, each of one or more areas on the sheet and one or more information types of information associated with each of the one or more areas based on the image of the sheet and the pre-trained first model, wherein each of the one or more areas is associated with all or part of the information carried on the sheet, and the pre-trained first model is a neural network based model;
    selecting, using the one or more computing devices, a pre-trained second model that is for the language to implement identifying, using the one or more computing devices, characters in each of the one or more areas based on the image of the sheet, each of the one or more areas, and the pre-trained second model, wherein the pre-trained second model is a neural network based model; and
    determining, using the one or more computing devices, the information carried on the sheet based on the identified one or more information types of the information associated with each of the one or more areas and the characters identified in each of the one or more areas.

2. The method according to claim 1, wherein identifying the characters in each of the one or more areas comprises: identifying the characters in each of the one or more areas based on an image of each of the one or more areas and the pre-trained second model.

3. The method according to claim 2, wherein an image of each of the one or more areas is outlined by a rectangle parallel to a horizontal line or a rectangle that tilts relative to a horizontal line.

4. The method according to claim 3, wherein in the case that each image of at least one of the one or more areas is outlined by a rectangle that tilts relative to a horizontal line, the method further comprising performing a tilt correction for each image of the at least one of the one or more areas before identifying the characters, wherein identifying the characters in each of the one or more areas comprises: identifying characters in the at least one of the one or more areas based on each image of the at least one of the one or more areas after the tilt correction and the pre-trained second model.

5. The method according to claim 1, wherein identifying the characters in each of the one or more areas comprises: identifying the characters in each of the one or more areas based on the image of the sheet, a position of each of the one or more areas, and the pre-trained second model.

6. The method according to claim 1, wherein the pre-trained first model is obtained by:
    labeling, using the one or more computing devices, for each sheet image sample in a first set of sheet image samples, each of one or more areas in each sheet image sample, wherein each of the one or more areas in each sheet image sample is associated with all or part of information carried on the sheet image sample; and
    training, using the one or more computing devices, a second neural network based on the labeled first set of sheet image samples to obtain the pre-trained first model.

7. The method according to claim 6, wherein the second neural network is established based on a deep residual network.

8. The method according to claim 1, wherein the pre-trained second model is obtained by:
    labeling, using the one or more computing devices, for each sheet image sample in a first set of sheet image samples, characters in each of one or more areas in each sheet image sample, wherein each of the one or more areas in each sheet image sample is associated with all or part of information carried on the sheet image sample; and
    training, using the one or more computing devices, a second neural network based on the labeled first set of sheet image samples to obtain the pre-trained second model.

9. The method according to claim 8, wherein the second neural network is established based on a recurrent neural network.

10. The method according to claim 1, wherein the pre-trained third model is obtained by:
    labeling, using the one or more computing devices, for each sheet image sample in a first set of sheet image samples, a category of each sheet image sample; and
    training, using the one or more computing devices, a second neural network based on the labeled first set of sheet image samples to obtain the pre-trained third model.

11. The method according to claim 10, wherein the second neural network is established based on a deep convolutional neural network.

12. A system for identifying information carried on a sheet, comprising:
    a plurality of first models that are neural network based models pre-trained respectively for categories of sheets;
    a plurality of second models that are neural network based models pre-trained respectively for categories of sheets;
    a third model that is a pre-trained neural network based model; and
    one or more first circuits configured to:
    identify a language of the sheet based on an image of the sheet and a pre-trained third model;
    select a matching first model that is for the language from the plurality of first models to identify each of one or more areas on the sheet and one or more information types of information associated with each of the one or more areas based on the image of the sheet and the matching first model, wherein each of the one or more areas is associated with all or part of the information carried on the sheet;
    select a matching second model that is for the language from the plurality of second models to identify characters in each of the one or more areas based on the image of the sheet, each of the one or more areas, and the matching second model; and determine the information carried on the sheet based on the identified one or more information types of the information associated with each of the one or more areas and the characters identified in each of the one or more areas.

13. The system according to claim 12, wherein identifying the characters in each of the one or more areas comprises: identifying the characters in each of the one or more areas based on an image of each of the one or more areas and the matching second model.

14. The system according to claim 13, wherein, an image of each of the one or more areas is outlined by a rectangle parallel to a horizontal line or a rectangle that tilts relative to a horizontal line, and the one or more first circuits are further configured to perform a tilt correction for each image of at least one of the one or more areas before identifying the characters in the case that each image of the at least one of the one or more areas is outlined by a rectangle that tilts relative to a horizontal line, wherein identifying the characters in each of the one or more areas comprises: identifying characters in the at least one of the one or more areas based on each image of the at least one of the one or more areas after the tilt correction and the matching second model.

15. The system according to claim 12, wherein identifying the characters in each of the one or more areas comprises: identifying the characters in each of the one or more areas based on the image of the sheet, a position of each of the one or more areas, and the matching second model.

16. The system according to claim 12, the system further comprising:

one or more second circuits configured to:

transmit the image of the sheet to the one or more first circuits; and acquire digitalized identified information carried on the sheet from the one or more first circuits.

17. A non-transitory computer readable storage medium having computer executable instructions stored thereon that, when executed by one or more processors, cause the one or more processors to:

identify a language of a sheet based on an image of the sheet and a pre-trained third model, wherein the pre-trained third model is a neural network based model;

select a pre-trained first model that is for the language to identify each of one or more areas on the sheet and one or more information types of information associated with each of the one or more areas based on the image of the sheet and the pre-trained first model, wherein each of the one or more areas is associated with all or part of information carried on the sheet, and the pre-trained first model is a neural network based model;

select a pre-trained second model that is for the language to identify characters in each of the one or more areas based on the image of the sheet, each of the one or more areas, and the pre-trained second model, wherein the pre-trained second model is a neural network based model; and determine the information carried on the sheet based on the identified one or more information types of the information associated with each of the one or more areas and the characters identified in each of the one or more areas.

* * * * *